United States Patent
Subat et al.

(10) Patent No.: US 9,428,090 B2
(45) Date of Patent: Aug. 30, 2016

(54) HEADREST WITH SPEAKERS AND METHOD FOR MANUFACTURING HEADREST CUSHION MEMBER

(71) Applicants: BOSE CORPORATION, Framingham, MA (US); Delta Tooling Co., Ltd., Hiroshima-shi (JP)

(72) Inventors: Bradford Kyle Subat, Northborough, MA (US); Tobe Z. Barksdale, Bolton, MA (US); Charles Oswald, Arlington, MA (US); Etsunori Fujita, Higashihiroshima (JP); Yumi Ogura, Higashihiroshima (JP); Seiji Kawasaki, Higashihiroshima (JP)

(73) Assignees: Bose Corporation, Framingham, MA (US); Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/453,905

(22) Filed: Aug. 7, 2014

(65) Prior Publication Data
US 2016/0039320 A1 Feb. 11, 2016

(51) Int. Cl.
| | | |
|---|---|---|
| *A47C 31/00* | (2006.01) | |
| *B60N 2/48* | (2006.01) | |
| *B29C 45/14* | (2006.01) | |

(Continued)

(52) U.S. Cl.
CPC ....... *B60N 2/4876* (2013.01); *B29C 45/14311* (2013.01); *H04R 1/02* (2013.01); *H04R 1/025* (2013.01); *H04R 1/28* (2013.01); *H04R 5/023* (2013.01); *B29C 2045/14327* (2013.01); *B29K 2075/00* (2013.01); *B29K 2105/04* (2013.01);

(Continued)

(58) Field of Classification Search
CPC .............................. B60N 2/4876; H04R 1/02
USPC ...................... 297/217.4, 217.5, 391, 188.01
See application file for complete search history.

(56) References Cited

U.S. PATENT DOCUMENTS

| | | | | |
|---|---|---|---|---|
| 3,512,605 A | * | 5/1970 | McCorkle | ............ B60N 2/4876 181/141 |
| 4,027,112 A | * | 5/1977 | Heppner | .................. A47C 7/38 381/104 |

(Continued)

FOREIGN PATENT DOCUMENTS

| | | |
|---|---|---|
| EP | 1 179 968 A2 | 2/2002 |
| EP | 1 179 968 A3 | 2/2002 |

(Continued)

OTHER PUBLICATIONS

International Search Report and Written Opinion issued Oct. 29, 2015 in PCT/US2015/039210.

*Primary Examiner* — Laurie K Cranmer
(74) *Attorney, Agent, or Firm* — Oblon, McClelland, Maier & Neustadt, L.L.P.

(57) ABSTRACT

There is provided a headrest with speakers capable of exhibiting an excellent sound effect. The headrest with speakers includes: a headrest frame; a pair of left and right enclosures supported by the headrest frame; speaker units supported in the enclosures respectively; and a headrest cushion member supported by the headrest frame to support a head, the headrest cushion member including: a net member having a pair of left and right acoustically transparent parts at places substantially facing the respective speaker units; and soundproof parts disposed between the pair of left and right acoustically transparent parts in the net member and between the pair of left and right enclosures respectively.

5 Claims, 18 Drawing Sheets

(51) Int. Cl.
*H04R 1/02* (2006.01)
*H04R 1/28* (2006.01)
*H04R 5/02* (2006.01)
B29K 75/00 (2006.01)
B29K 105/04 (2006.01)
B29L 31/30 (2006.01)

(52) U.S. Cl.
CPC .... *B29L 2031/3023* (2013.01); *H04R 2499/13* (2013.01)

(56) References Cited

U.S. PATENT DOCUMENTS

| | | | | |
|---|---|---|---|---|
| 4,638,884 A | * | 1/1987 | Lee | H04R 5/023 181/141 |
| 5,387,026 A | * | 2/1995 | Matsuhashi | A47C 7/72 297/217.4 |
| 6,681,024 B2 | * | 1/2004 | Klein | H04R 5/02 181/151 |
| 6,904,157 B2 | * | 6/2005 | Shima | H04R 1/025 381/333 |
| 6,975,737 B2 | * | 12/2005 | Hirao | H04R 5/023 297/217.4 |
| 7,077,405 B2 | * | 7/2006 | Akpom | B62B 9/26 280/47.38 |
| 7,668,329 B2 | * | 2/2010 | Matsuhashi | B60R 11/0217 297/217.4 |
| 7,686,399 B2 | * | 3/2010 | Heidmann | A47C 7/405 297/284.4 |
| RE41,384 E | * | 6/2010 | House | H04R 5/02 381/332 |
| 8,130,987 B2 | * | 3/2012 | Kaneda | H04R 1/26 381/301 |
| 8,480,176 B2 | * | 7/2013 | Yamada | A61G 15/10 297/391 |
| 2002/0018576 A1 | | 2/2002 | Shima | |
| 2004/0258270 A1 | | 12/2004 | Shima | |
| 2005/0190935 A1 | * | 9/2005 | Sakamoto | H04R 5/02 381/302 |
| 2007/0001494 A1 | * | 1/2007 | Hoover | A47C 7/72 297/217.4 |
| 2009/0257616 A1 | | 10/2009 | Kaneda et al. | |
| 2010/0148550 A1 | * | 6/2010 | Kidd | B60N 2/4876 297/217.4 |
| 2010/0320819 A1 | * | 12/2010 | Cohen | A61H 23/0236 297/217.4 |

FOREIGN PATENT DOCUMENTS

| | | |
|---|---|---|
| JP | 4-325338 A | 11/1992 |
| JP | 2005-58287 | 3/2005 |
| JP | 2008-295597 A | 12/2008 |
| JP | 2009-247388 | 10/2009 |

\* cited by examiner

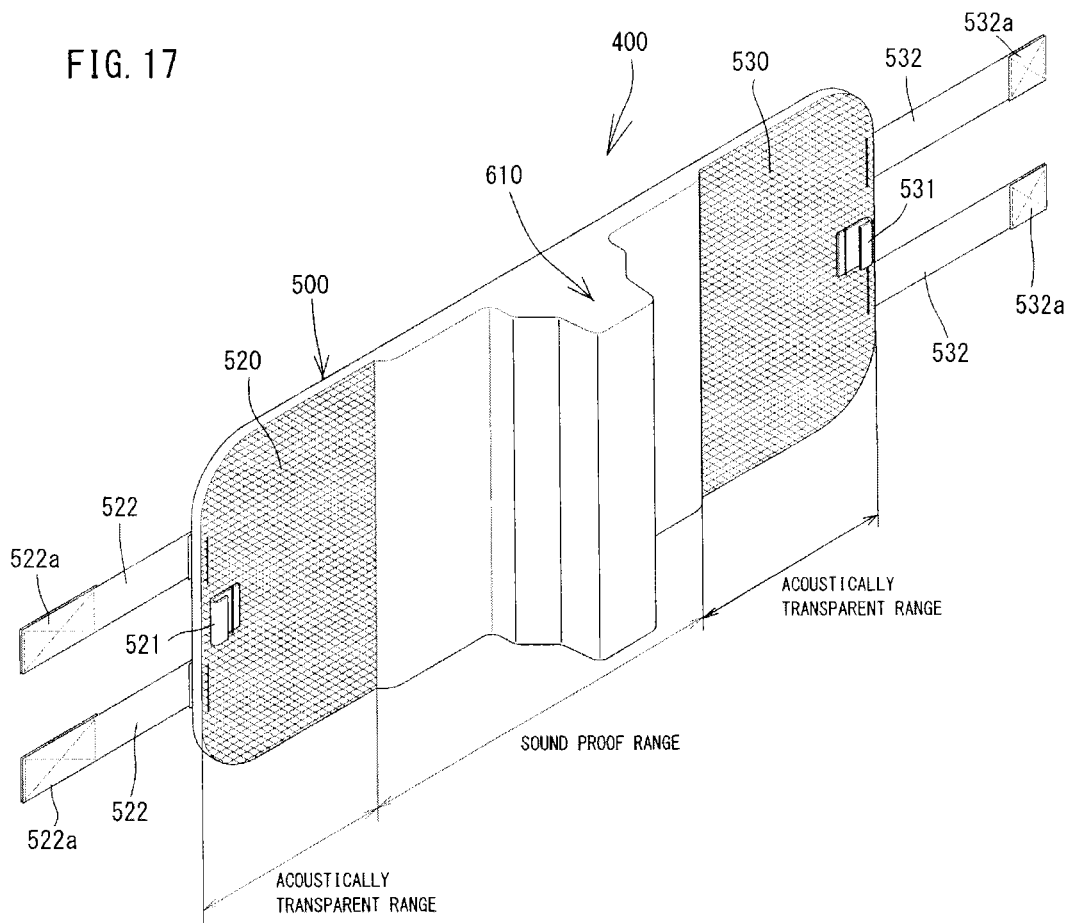

HEADREST WITH SPEAKERS AND METHOD FOR MANUFACTURING HEADREST CUSHION MEMBER

BACKGROUND

1. Field

This disclosure generally relates to a headrest with speakers and a method for manufacturing a headrest cushion member used in the headrest.

2. Description of the Related Art

Patent Document 1 discloses the following headrest. Specifically, the headrest includes: a box member in a substantially rectangular parallelepiped shape forming a skeletal frame of the headrest; a pad member disposed on a front surface side of the box member in the substantially rectangular parallelepiped shape; net members disposed on left and right of a front surface side of the pad member; a slab member disposed between the left and right net members; and an outer layer member covering the left and right net members, the slab member, and so on.

The box member in the substantially rectangular parallelepiped shape forming the skeletal frame of the headrest includes: a rear cover having a front opening and thus having a substantially concave cross section; and a front panel disposed so as to close the front opening of the rear cover. In an inner space of the box member composed of the front panel and the rear cover, a pair of left and right speakers are disposed. Further, the front panel, the pad member, and the outer layer member have through holes for sound passage at their places located in front of sound output parts of the speakers, and sounds of the speakers are output to the outside through the through holes and the aforesaid net members.

Patent Document 1: Japanese Patent Application Laid-open No. 2009-247388

The headrest of Patent Document 1 merely has the structure in which the speakers are held in the box member forming the skeletal frame of the headrest and in order to allow the passage of the sounds of the speakers, the through holes are provided at the corresponding places. In more detail, the speakers, as finished products, in which speaker units as sound output devices are assembled in their enclosures are surrounded by the front panel and the rear cover to be protected so that the speakers are not damaged by a load applied to the headrest at the normal use time. Further, the through holes for allowing the sounds to be output to the outside are provided, the net members for preventing part of the head from sinking into the through holes are further provided, and in addition, the slab member is provided in order to avoid a level difference between the left and right net members to ensure a more comfortable support feeling.

As described above, Patent Document 1 is characterized only in that the speakers are simply installed inside the headrest, and meshes which cover the through holes to prevent the head from sinking in the through holes are only formed large enough to pass the sounds output from the speakers as they are (refer to paragraph [0019] of Patent Document 1). That is, the speakers are installed inside the headrest, but no consideration is made on a structure for producing a more excellent sound effect.

SUMMARY

In one aspect, a headrest with speakers includes: a headrest frame; a pair of left and right enclosures supported by the headrest frame; speaker units supported in the enclosures respectively; and a headrest cushion member supported by the headrest frame to support a head, the headrest cushion member including: a net member having a pair of left and right acoustically transparent parts at places substantially facing the respective speaker units; and soundproof parts disposed between the pair of left and right acoustically transparent parts in the net member and between the pair of left and right enclosures respectively.

Preferably, the acoustically transparent parts and the soundproof part located between the pair of left and right acoustically transparent parts in the net member are integrally formed. The soundproof parts can be each formed by using at least one of a sound insulating material and a sound absorbing material.

Preferably, the soundproof parts are each formed by using polyurethane foam. Preferably, the net member is provided with a predetermined tension in a plane direction. Preferably, the net member is a three-dimensional knitted fabric.

Preferably, part of the headrest cushion member including the net member is in contact with the pair of left and right enclosures, and each of the enclosures together with the headrest frame functions as a skeletal frame member to support the headrest cushion member. Preferably, the headrest frame has a pair of left and right headrest stays which are position-adjustably inserted into guide members supported by a back frame forming a seat back, each of the headrest stays is formed of a cylindrical member, and electric wires of the speaker units drawn out of the enclosures are inserted into the respective headrest stays formed of the cylindrical members.

Another implementation features a method for manufacturing a headrest cushion member for supporting a head, the headrest cushion member including a net member having acoustically transparent parts for a pair of left and right speaker units installed in a headrest, the method including: placing the net member between an upper mold and a lower mold; pressing left and right parts of the net member by the upper mold and the lower mold; injecting a synthetic resin material forming a soundproof part into a space between the upper mold and the lower mold to make the synthetic resin material penetrate into a middle part of the net member; and integrally molding the soundproof part containing the synthetic resin material at the middle part of the net member with the acoustically transparent parts at the left and right parts of the net member.

Preferably, the synthetic resin material is a polyurethane foam material.

BRIEF DESCRIPTION OF THE DRAWINGS

FIG. 17 is a perspective view illustrating a structure, being part of a headrest cushion member, in which a net member and a main soundproof part are integrally molded.

DETAILED DESCRIPTION OF THE PREFERRED EMBODIMENTS

Figure 1:
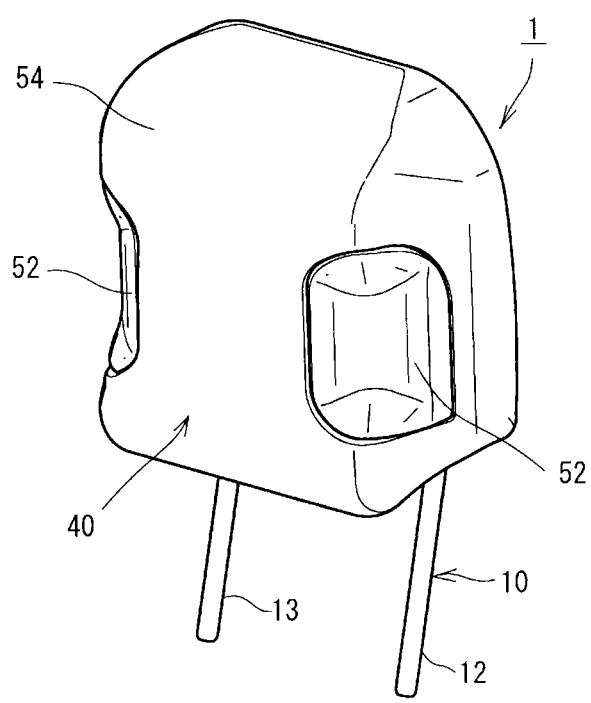
FIG. 1 is a perspective view illustrating an outer appearance of a headrest according to a first implementation.
Figure 2:
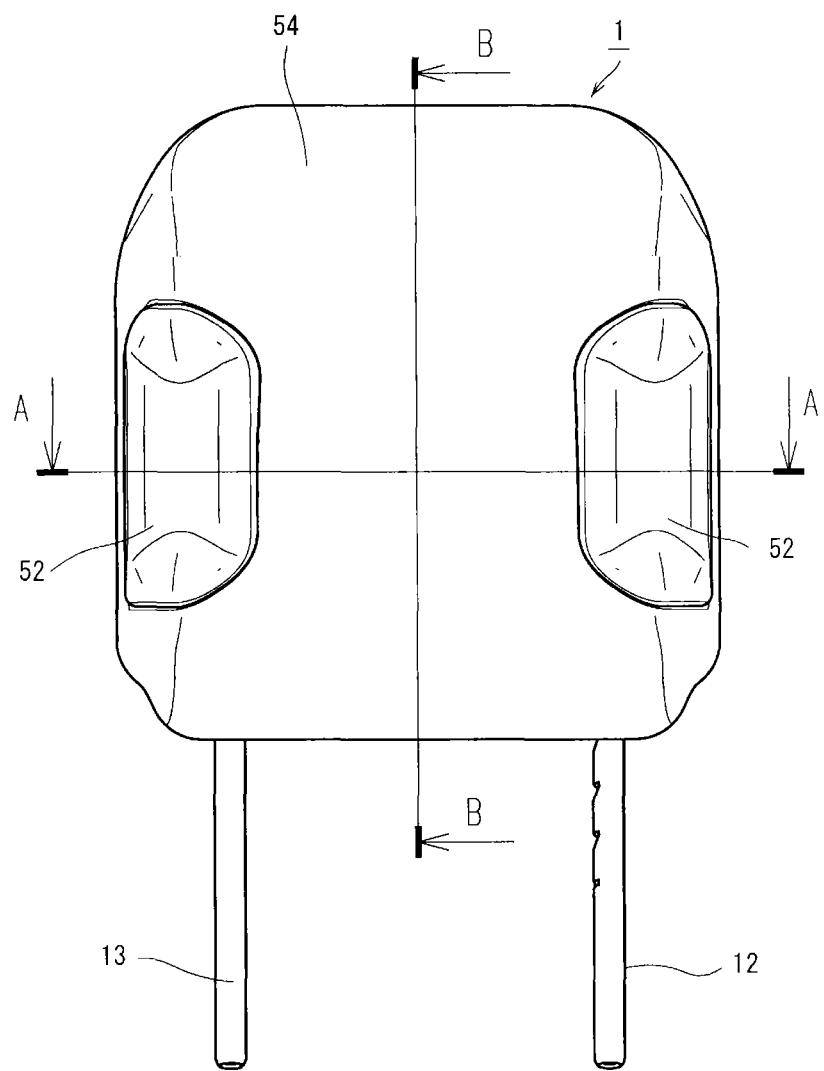
FIG. 2 is a front view of FIG. 1.
Figure 3:
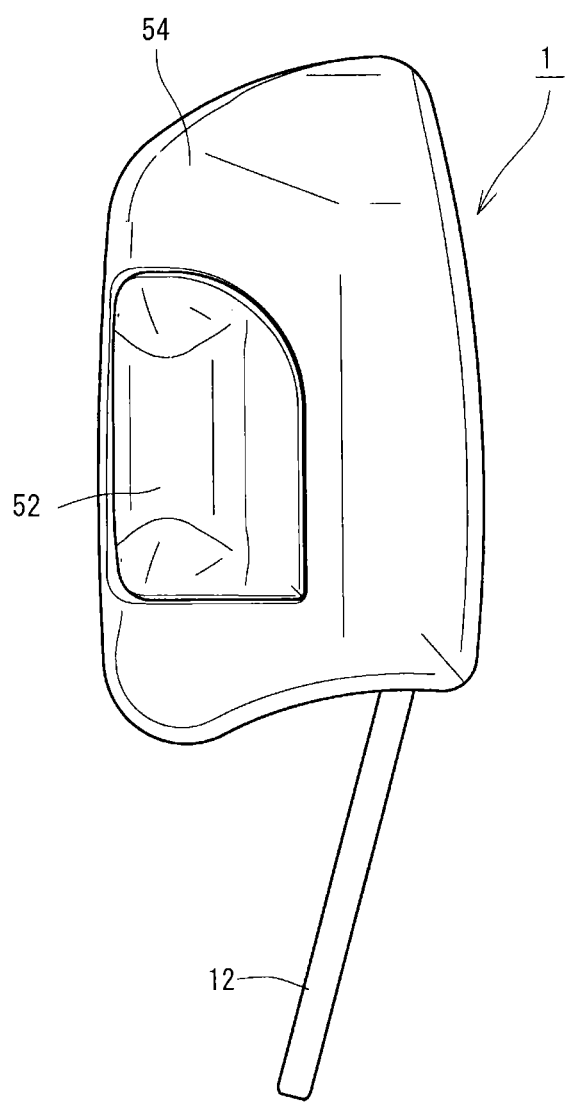
FIG. 3 is a side view of FIG. 2.

FIG. 1 to FIG. 12 are views illustrating a headrest 1 according to a first implementation. The headrest 1 is supported on an upper part of a seat back of a vehicle seat.

The headrest 1 includes a headrest frame 10, enclosures 21, 22, speaker units 31, 32, and a headrest cushion member 40.

In this embodiment, the headrest frame 10 includes a main frame 11 and a pair of left and right headrest stays 12, 13 (refer to FIG. 6 to FIG. 12). The main frame 11 is formed in a substantially U shape in a plane view. The main frame 11 has: a connecting side corresponding part 11a that corresponds to a connecting side in the substantially U shape and extends substantially horizontally along a width direction on a front side; a pair of end side corresponding parts 11b, 11c that face each other across the connecting side corresponding part 11a, in the substantially U shape and extend substantially horizontally on a more rear side than the connecting side corresponding parts 11a, and vertical stick-shaped parts 11d, 11e extending downward from end parts of the end side corresponding parts 11b, 11c respectively.

The headrest stays 12, 13 have upper parts welded to the vertical stick-shaped parts 11d, 11e of the main frame 11 and extend downward. The headrest stays 12, 13 are inserted to a pair of guide members (not illustrated) supported by a back frame (not illustrated) of the seat back at a predetermined interval apart from each other in a left and right direction respectively, and their position is adjustable to an appropriate height.

In this implementation, the enclosures 21, 22 are provided in pair at positions substantially symmetrical with each other in the left and right direction. Concretely, as illustrated in FIG. 7 to FIG. 10 and FIG. 12, the enclosures 21, 22 include: main body cases 211, 221 having a substantially C-shaped cross section and having openings 211a, 221a in a substantially elliptic shape in a front view; and cover plates 212, 222 in a substantially elliptic shape mounted on the openings 211a, 221a. The main body cases 211, 221 and the cover plates 212, 222 are each made of iron-based metal, and peripheral edges of the cover plates 212, 222 are integrated with the openings 211a, 221a. In this implementation, the peripheral edges of the openings 211a, 221a and the cover plates 212, 222 are partly overlapped with each other and are integrated by caulking. The caulking is preferably used for the integration since the use of an adhesive affects a reflected sound effect of the enclosures 21, 22 due to a sound absorption action of the adhesive. At substantially center parts of the cover plates 212, 222, windows 212a, 222a are opened.

The main body cases 211, 221 of the enclosures 21, 22 are attached to upper parts of the left and right headrest stays 12, 13 via attachment plates 121, 131 respectively. The main body cases 211, 221 are attached in a laterally symmetrical posture so that their openings 211a, 221a face outward with respect to the center of the headrest 1 rather than facing forward. In this implementation, the openings 211a, 221a face outward with respect to a front side (straight forward) by about 45 degrees. This angle is appropriately set depending on a desired way the sounds form the speaker units 31, 32 spread and a use environment and the like. For example, when the headrest 1 is used for a vehicle seat, the openings 211a, 221a preferably face outward with respect to the front side by about 20 degrees to 70 degrees, and more preferably face outward with respect to the front side by about 45 degrees as in this implementation. Incidentally, in this implementation, the enclosures 21, 22 are attached to the headrest stays 12, 13. This is because the vertical stick-shaped parts 11d, 11e of the main frame 11 are welded along outer sides of the headrest stays 12, 13 (refer to FIG. 10 and FIG. 11). If the vertical stick-shaped parts 11d, 11e are welded to inner sides of the headrest stays 12, 13, it is of course possible to attach the enclosures 21, 22 to the vertical stick-shaped parts 11d, 11e, and to which of them the enclosures 21, 22 are attached is not limited.

Further, the enclosures 21, 22 are fixedly coupled with each other via a coupling plate 23. The coupling plate 23 is preferably made of spring steel, which has an effect of absorbing vibration and impact applied to the headrest 1.

The speaker units 31, 32 are housed in the aforesaid enclosures 21, 22, and form speakers together with the enclosures 21, 22. The speaker units 31, 32 are disposed so that their diaphragms 311, 321 are located at positions corresponding to the windows 212a, 222a formed in the cover plates 212, 222 of the enclosures 21, 22 to face the outside from the windows 212a, 222a.

Here, the headrest stays 12, 13 are formed of cylindrical members in this implementation. Electric wires (including harnesses) 312, 322 of the speaker units 31, 32 are inserted into the headrest stays 12, 13 from upper end openings 12a, 13a of the headrest stays 12, 13 via upper through holes 211b, 221b of the main body cases 211, 221 of the enclosures 21, 22 and are drawn out from lower openings 12b, 13b of the headrest stays 12, 13. This structure can facilitate the arrangement as well as prevent the electric wires 312, 322 drawn out of the headrest 1 from obstructing other members.

The headrest cushion member 40 has a function of resiliently supporting a head and absorbing vibration and impact transmitted via the back frame and the headrest frame 10 while the vehicle is running. In this respect, the headrest cushion member 40 of this implementation has a similar function as that of a cushion member in an ordinary headrest not having built-in speakers, but in this implementation, the headrest cushion member 40 has not only this function but also a function of enhancing a sound effect of the speaker units 31, 32.

The headrest cushion member 40 of this implementation is composed of the combination of a net member 50 having an acoustical transparency and a soundproof part 60 having a soundproof function of reducing mutual interference of the speaker units 31, 32.

Figure 4:
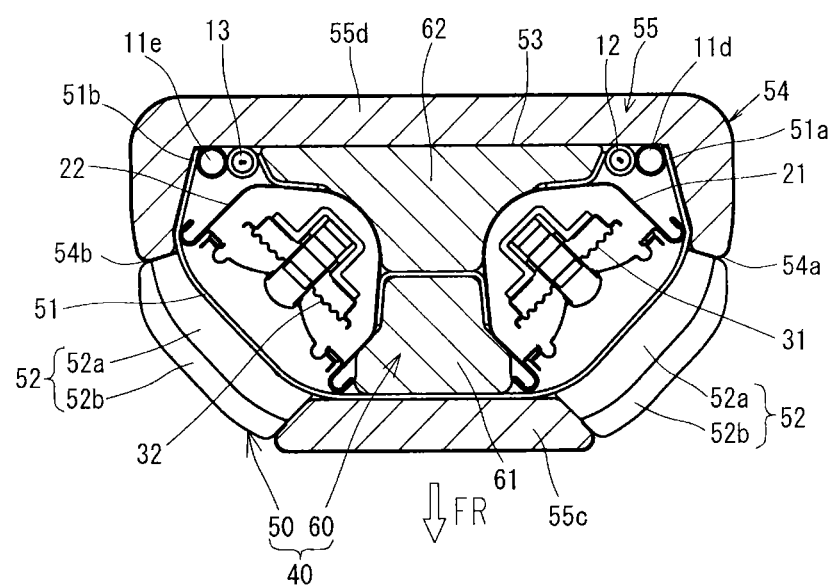
FIG. 4 is a cross-sectional view taken along A-A line in FIG. 2.
Figure 5:
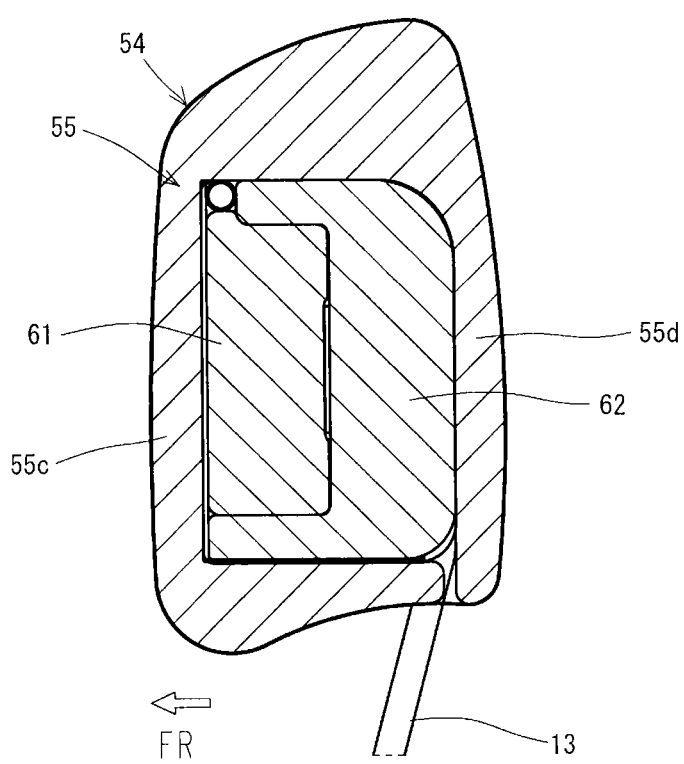
FIG. 5 is a cross-sectional view taken along B-B line in FIG. 2.

As illustrated in FIG. 4, the net member 50 includes a support net 51 and outer cover nets 52, 52 stacked on the support net 51. The support net 51 is made of a two-dimensional net, and as illustrated in FIG. 4, the support net 51 is set with a tension in a manner that it is supported by the vertical stick-shaped part 11d of the main frame 11 at its one end 51a, is hung around so as to pass in front of the enclosures 21, 22, and is supported by the other vertical stick-shaped part 11e at its other end 51b. Means for making the one end 51a and the other end 51b supported by the vertical stick-shaped parts 11d, 11e may be any. For example, engagement members (not illustrated) in a substantially U shape can be coupled to the ends 51a, 51b to be engaged with the vertical stick-shaped parts 11d, 11e. In this implementation, a cloth member 53 (refer to FIG. 4 and FIG. 6) is stretched between the one end 51a and the other end 51b of the two-dimensional net 51, and this cloth member 53 is hung around to rear surface sides of the vertical stick-shaped parts 11d, 11e.

On the front surfaces of the enclosures 21, 22, the peripheral edges of the cover plates 212, 222 are integrated with the peripheral edges of the openings 211a, 221a of the main body cases 211, 221 by caulking as described above. Therefore, when the support net 51 is hung around so as to pass in front of the enclosures 21, 22, this support net 51 is stretched and supported by the peripheral edges of the openings 211a, 221a of the main body cases 211, 221. That is, the main body cases 211, 221 of the enclosures 21, 22 forming the speakers are used as skeletal frame members supporting the support net 51 of the headrest cushion member 40 similarly to the headrest frame 10. Therefore, the main body cases 211, 221, preferably, including the cover plates 212, 222, are made of metal as described above so that the enclosures 21, 22 exhibit predetermined strength as the skeletal frame members.

Figure 6:
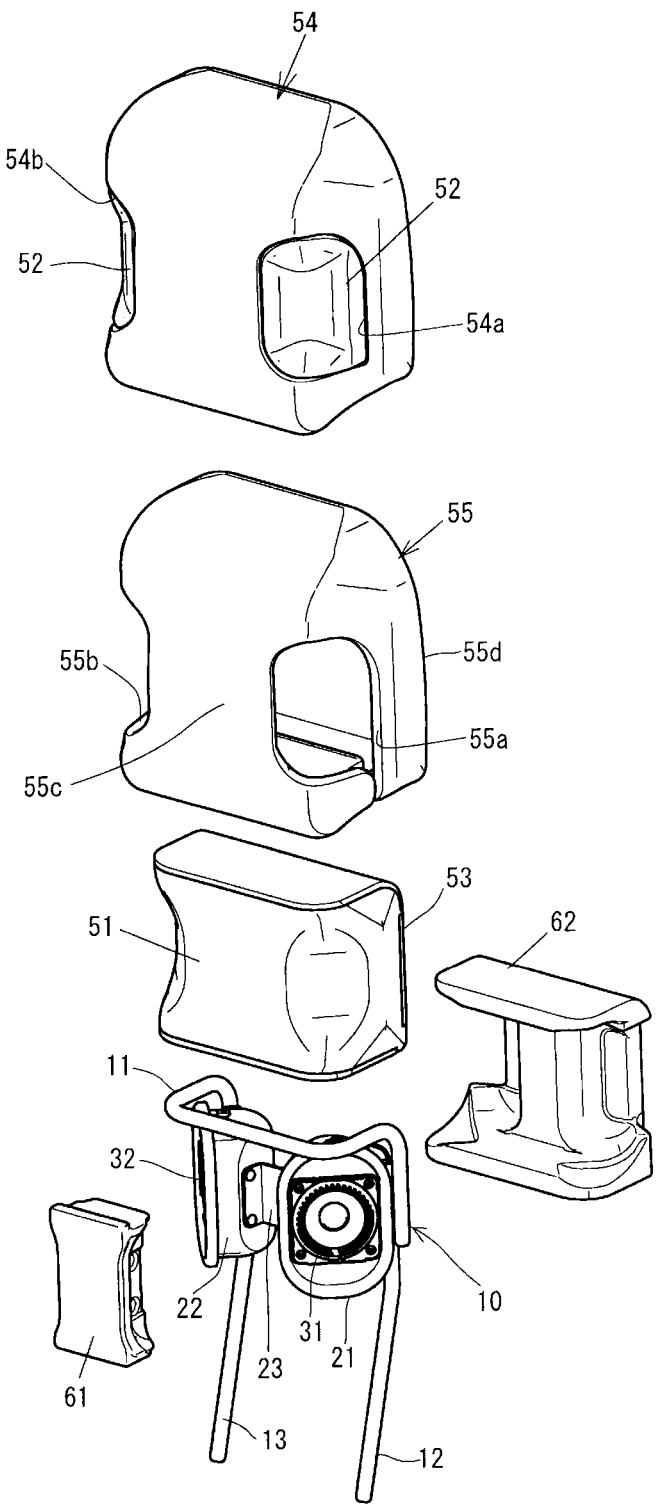
FIG. 6 is an exploded perspective view of the headrest illustrated in FIG. 1 to FIG. 3.
Figure 7:
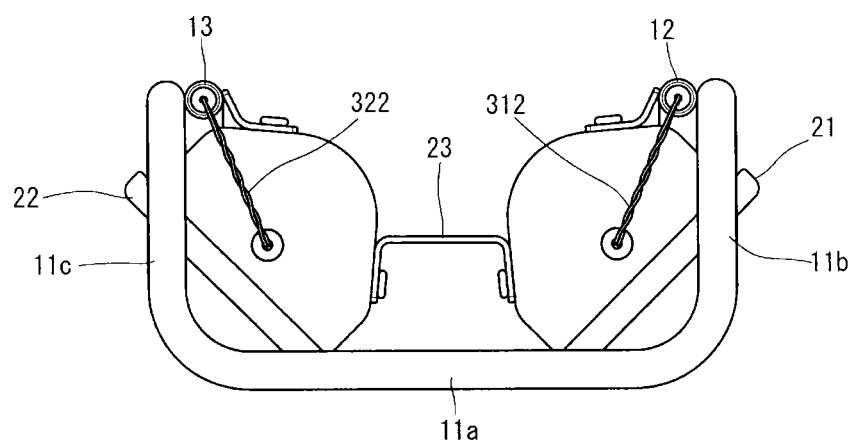
FIG. 7 is a plane view illustrating the structures of a headrest frame, enclosures, and speaker units of the headrest according to the first implementation.
Figure 8:
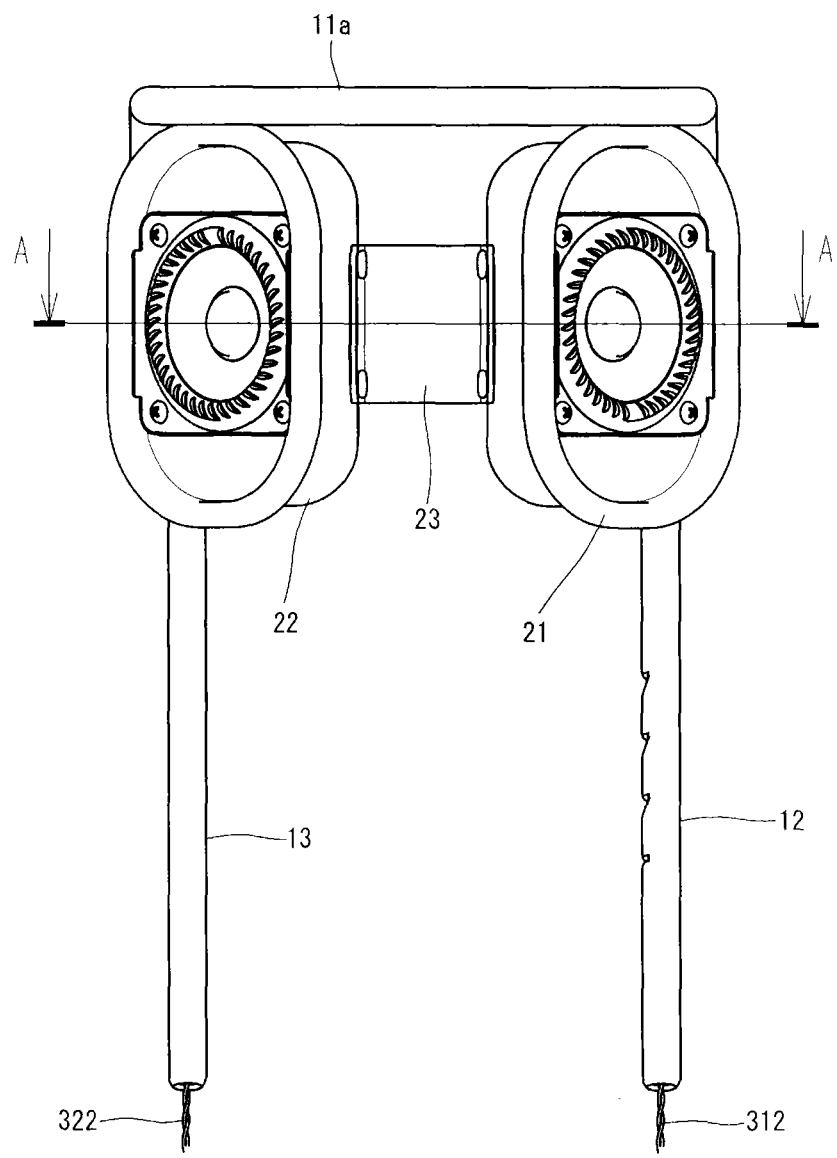
FIG. 8 is a front view of FIG. 7.
Figure 9:
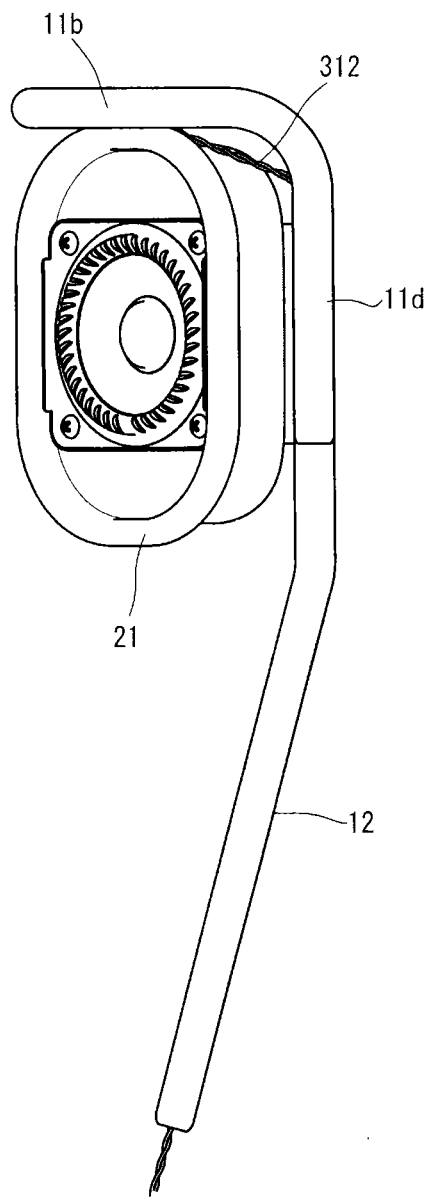
FIG. 9 is a side view of FIG. 7.
Figure 10:
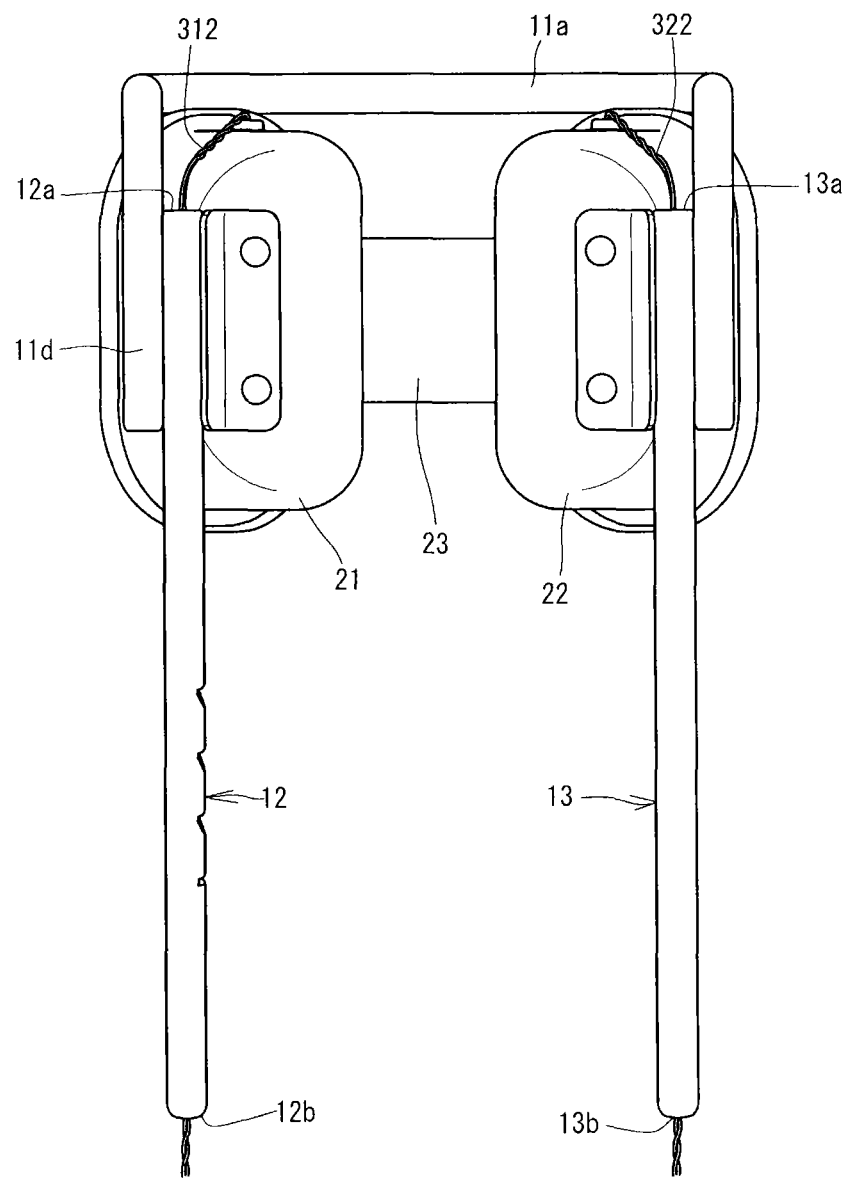
FIG. 10 is a rear view of FIG. 7.
Figure 11:
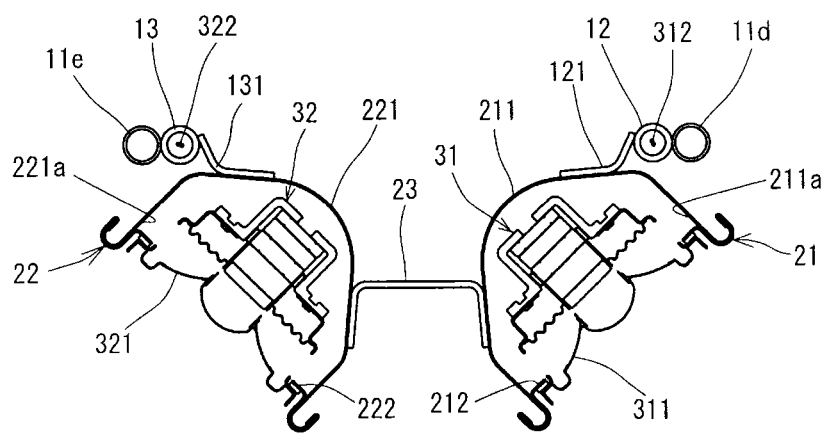
FIG. 11 is a cross-sectional view taken along A-A line in FIG. 8.
Figure 12:
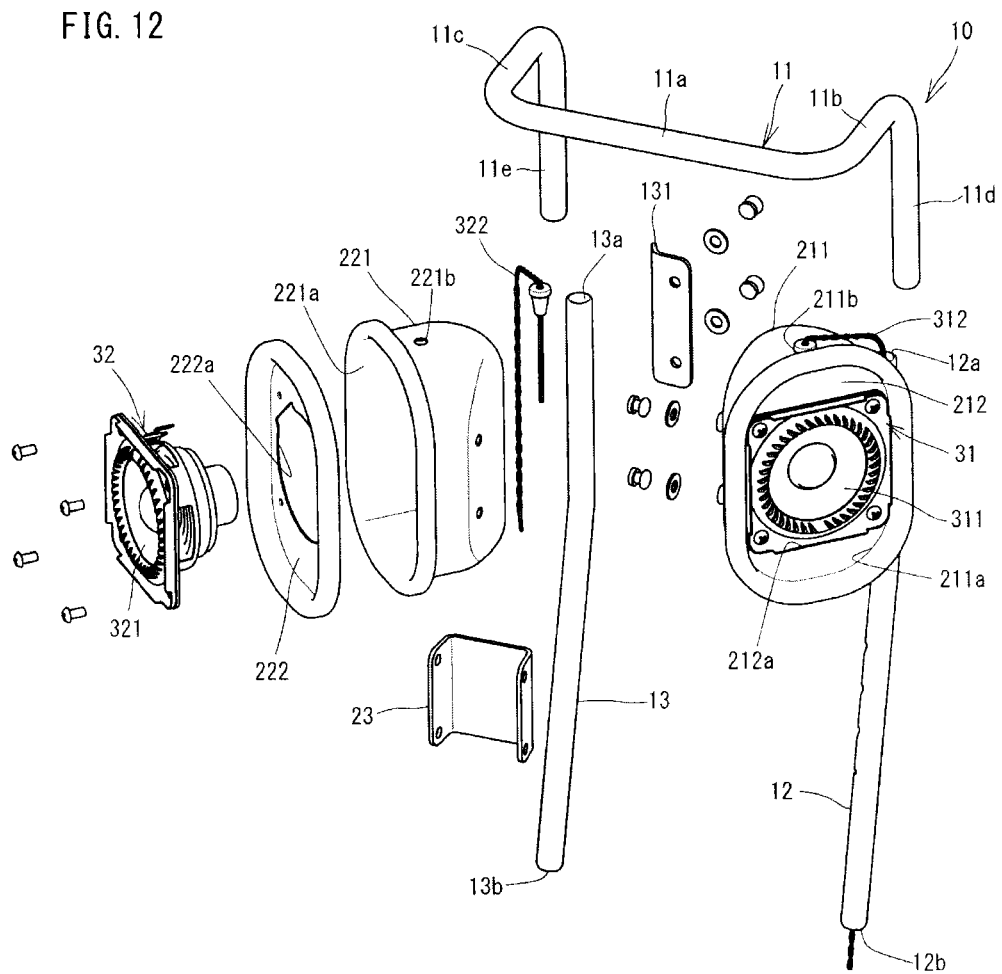
FIG. 12 is an exploded perspective view of the headrest frame, the enclosures, and the speaker units illustrated in FIG. 7 to FIG. 11.
Figure 13:
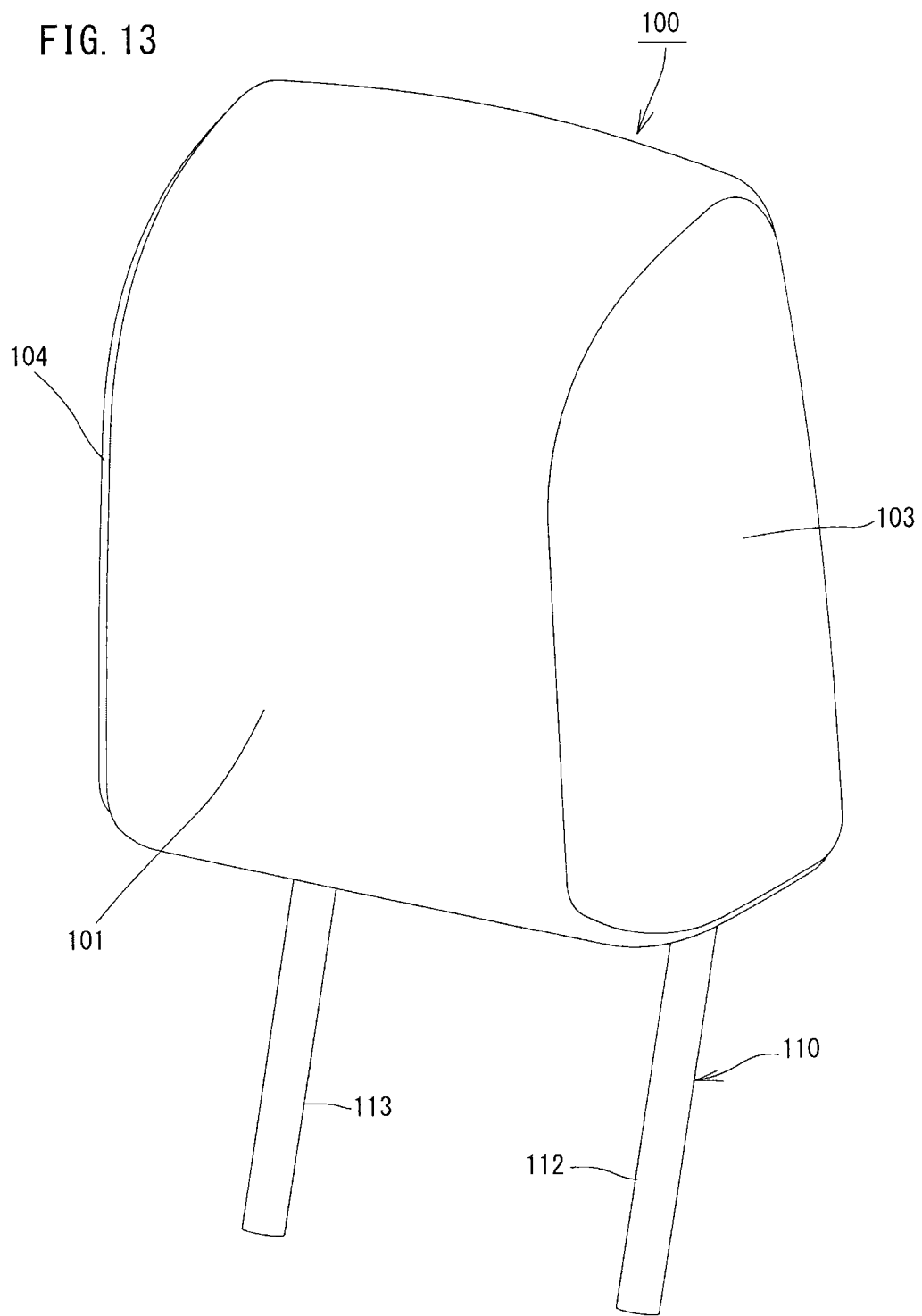
FIG. 13 is a perspective view illustrating an outer appearance of a headrest according to a second implementation.
Figure 14:
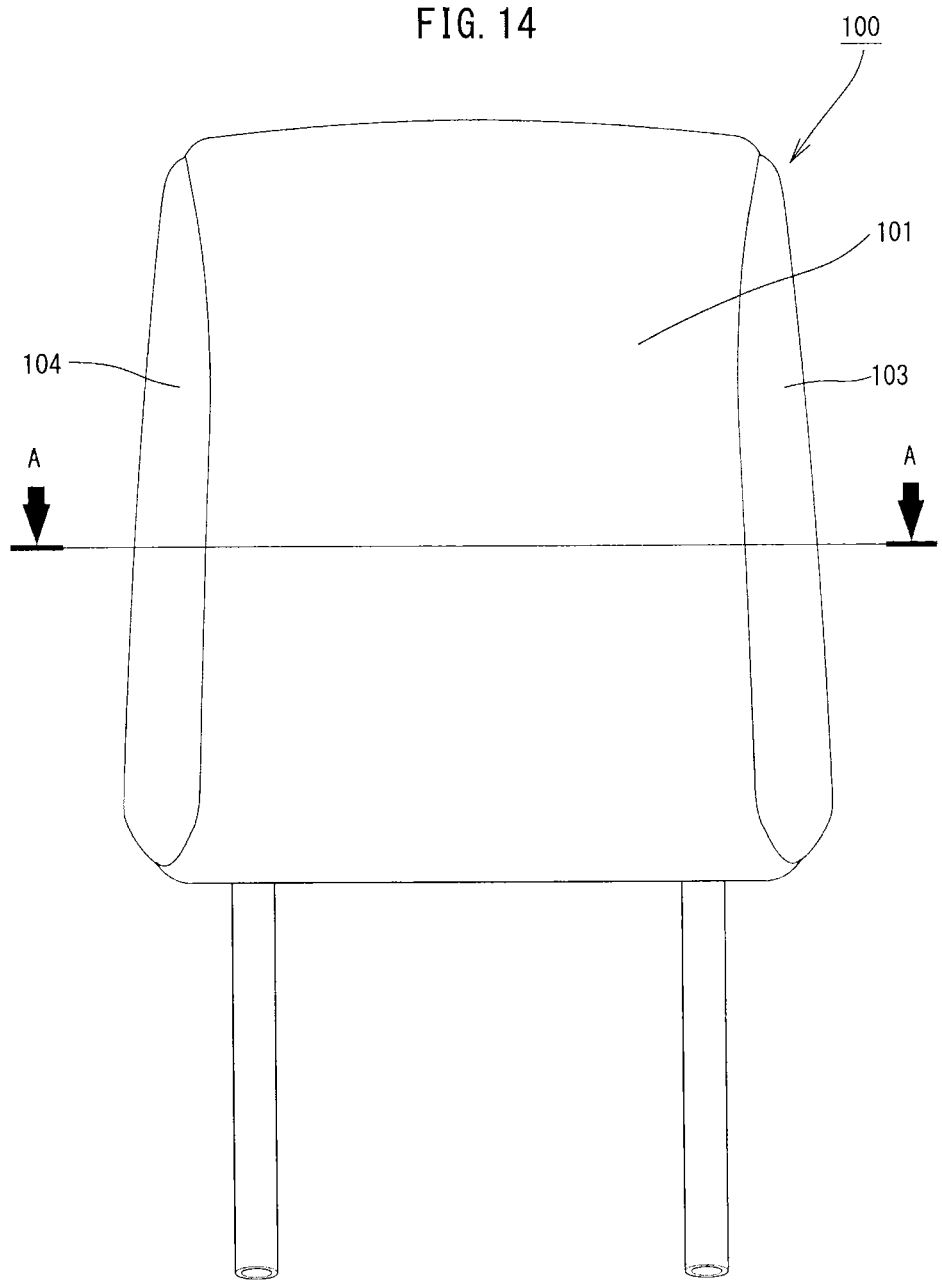
FIG. 14 is a front view of FIG. 13.

The outer cover nets 52, 52 are disposed in front of the speaker units 31, 32 respectively so as to be stacked on the outer side of the support net 51. More, concretely, in this implementation, as illustrated in FIG. 4 and FIG. 6, an outer layer member 54 covering the whole headrest 1 is formed in a bag shape having an opening at its lower end, and has openings 54a, 54b formed at positions in front of the speaker units 31, 32, and two layers of three-dimensional knitted fabrics 52a, 52b are stitched to peripheral edges of the openings 54a, 54b, so that the outer cover nets 52, 52 are supported.

Further, an urethane pad 55 made of polyurethane foam (mold urethane) has openings 55a, 55b at positions in front of the speaker units 31, 32, is molded into substantially the same shape as that of the outer layer member 54, and is disposed on an inner side of the outer layer member 54. The outer cover nets 52, 52 made of two layers of the three-dimensional knitted fabrics 52a, 52b stitched to the openings 54a, 54b of the outer layer member 54 are disposed on the openings 55a, 55b of the urethane pad 55. Consequently, in this implementation, the outer cover nets 52, 52 disposed at the positions facing the speaker units 31, 32 and the corresponding parts of the support net 51 function as acoustically transparent parts which allow for the passage of acoustic energy. Incidentally, the urethane pad 55 has a front pad part 55c located between the aforesaid openings 55a, 55b and a rear pad part 55d covering a rear surface side. The front pad part 55c is located between the pair of outer cover nets 52, 52 and constitutes a soundproof part located between the pair of acoustically transparent parts.

The three-dimensional knitted fabrics 52a, 52b forming the outer cover nets 52, 52 are each formed by combining a pair of ground knitted fabrics disposed apart from each other, by a connecting yarn. For example, in forming each of the ground knitted fabrics, a yarn made of twisted fibers is used to form a flat knitted fabric structure (fine mesh) which is continuous in both a wale direction and a course direction or to form a knitted fabric structure having honeycomb-shaped (hexagonal) meshes. The connecting yarn gives predetermined stiffness to the three-dimensional knitted fabric so that one of the ground knitted fabrics and the other ground knitted fabric are kept a predetermined interval apart from each other.

The three-dimensional knitted fabrics are each preferably provided with a predetermined tension in a plane direction so as to prominently exhibit the aforesaid acoustic transparency and to provide protection to the speaker units 31, 32 by allowing the three-dimensional knitted fabrics to act as resilient protective shields in front of the speaker units 31, 32. This also applies to the support net 51 made of the two-dimensional net. The tension in the two-dimensional net and the three-dimensional knitted fabrics can also provide the headrest cushion member 40 with added mechanical absorption. The tension up to about 25% elongation percentage can be applied depending on materials of the two-dimensional net and the three-dimensional knitted fabrics. However, since the application of too strong a tension impairs a cushioning property and stroke for supporting the head, the tension is generally preferably about 3% to about 10%. Further, in the case of the three-dimensional knitted fabrics, the acoustic transparency can be adjusted by their thickness, the knitted fabric structure of the ground knitted fabrics, a way the connecting yarns are knitted to the ground knitted fabrics, and thickness, materials, and the like of the yarns and the connecting yarns forming the ground knitted fabrics.

While functioning as the acoustically transparent parts, the outer cover nets 52, 52 have a cushioning function for resiliently supporting the head. Specifically, the three-dimensional knitted fabrics forming the outer cover nets 52, 52 support a load of the head by deformation and resilience of the meshes forming the ground knitted fabrics, the deformation of the connecting yarns (tilting and buckling), and resilience of the adjacent connecting yarn giving a spring property to the deformed connecting yarn. As materials of the yarns and the connecting yarns forming the ground knitted fabrics, various kinds of materials can be used. For example, synthetic fiber and regenerated fiber such as polypropylene, polyester, polyamide, polyacrylonitrile, and rayon, natural fiber such as wool, silk, and cotton can be used. Each of the above materials may be used solely or the combination of arbitrary ones out of them can be used as the material. Preferably, a thermoplastic polyester-based fiber represented by polyethylene terephthalate (PET), polybutylene terephthalate (PBT) and the like, polyamide-based fiber represented by nylon 6, nylon 66, and the like, polyolefine-based fiber represented by polyethylene, polypropylene, and the like, and the combination of two kinds or more of these fibers can be used. Further, the yarn shape of the ground yarns or the connecting yarns is not limited, and they may be round cross-section yarns, modified cross-section yarns, and the like.

Next, the soundproof part 60 forming the headrest cushion member 40 together with the aforesaid net member 50 will be described. In this implementation, the two left and right speaker units 31, 32 are disposed in a range of a size appropriate as the headrest 1, and in a case of an ordinary headrest of a vehicle seat, in a range of about 20 cm to about 40 cm. Therefore, when the two left and right speaker units 31, 32 are disposed in this range, an interval between these speaker units 31, 32 is too narrow to sufficiently produce the desired sound field. Therefore, in this implementation, the soundproof part 60 is provided between the the speaker units 31, 32 to reduce the mutual interference of the sounds, thereby enhancing a sound effect. At the same time, by using one having a predetermined cushioning property as the soundproof part 60, the soundproof part 60 also has the function of the headrest cushion member 40.

In this implementation, the sounds of the speaker units 31, 32 are output to the outside through the pair of left and right outer cover nets 52, 52 which are the acoustically transparent parts. Therefore, the soundproof part 60 is preferably provided between the pair of acoustically transparent parts, that is, between the pair of outer cover nets 52, 52 and between the enclosures 21, 21 in which the speaker units 31, 32 are installed. In this implementation, first, in the urethane pad 55, the front pad part 55c between the pair of openings 55a, 55b where the pair of outer cover nets 52, 52 are located is part of the soundproof part 60 disposed between the acoustically transparent parts being the pair of outer cover nets 52, 52.

Next, in this implementation, an inter-enclosure main soundproof part 61 made of polyurethane foam is provided between the coupling plate 23, which is provided between the enclosures 21, 22, and the support net 51. Incidentally, it is preferable that, between the enclosures 21, 22, not only the inter-enclosure main soundproof part 61 is provided but also an inter-enclosure auxiliary soundproof part 62 made of polyurethane foam is provided between the coupling plate 23 and the rear pad part 55d, and the both are formed in combination.

In this implementation, the soundproof parts 60 are each made of polyurethane foam, but may be formed by using at least one of well-known sound insulating material and sound absorbing material, and for example, may be made of glass wool or may have a complex structure of a polyurethane foam layer and a glass wool layer, instead of using polyurethane foam. Further, the soundproof parts 60 can be made of only the sound insulating material or only the sound absorbing material, or may be made of a complex structure of the both. However, since the soundproof parts 60 of this implementation need to have the cushioning function for supporting the head, the use of polyurethane foam is preferable as described above.

In the headrest 1 of this implementation, the sounds output from the speaker units 31, 32 are output to the outside after transmitting through the net member 50 forming the headrest cushion member 40. At this time, the enclosures 21, 22 which are members forming the speakers together with the speaker units 31, 32 are made of metal, and the headrest cushion member 40 is supported by the enclosures 21, 22. That is, in this structure, the constituent members of the speakers also function as the skeletal frame members of the headrest 1, and since the headrest cushion member 40 itself having a function of resiliently supporting the head has acoustically transparent parts, it is not necessary to form through holes in the constituent members so as to allow the output of the sound to the outside. Therefore, the number of parts can be smaller, the structure can be simpler, and manufacturing cost can be lower than conventionally. Further, the structure in which the headrest cushion member 40 includes the three-dimensional knitted fabrics makes it possible to provide the headrest 1 having various kinds of sound properties depending on the selection of materials of the three-dimensional knitted fabrics, and the density, the stack number, and the like of the connecting yarns.

Further, the headrest 1 of this implementation has the front pad part 55c and the inter-enclosure main soundproof part 61 which are the soundproof parts 60 disposed between the outer cover nets 52, 52 being the pair of left and right acoustically transparent parts and between the pair of left and right enclosures 21, 22, and preferably has, in addition to these, the inter-enclosure auxiliary soundproof part 62. Therefore, it is possible to reduce the sound interference between the pair of left and right speaker units 31, 32 which are disposed in the narrow range of the head rest 1, thereby making it possible to provide the desired sound field.

Figure 15:
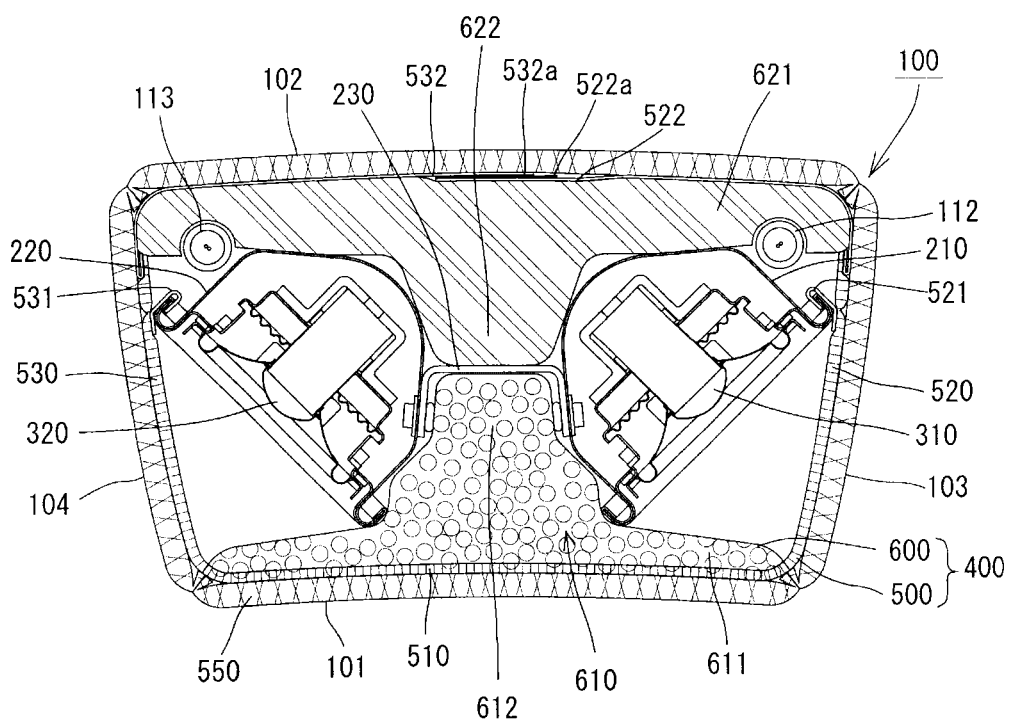
FIG. 15 is a cross-sectional view taken along A-A line in FIG. 14.
Figure 16:
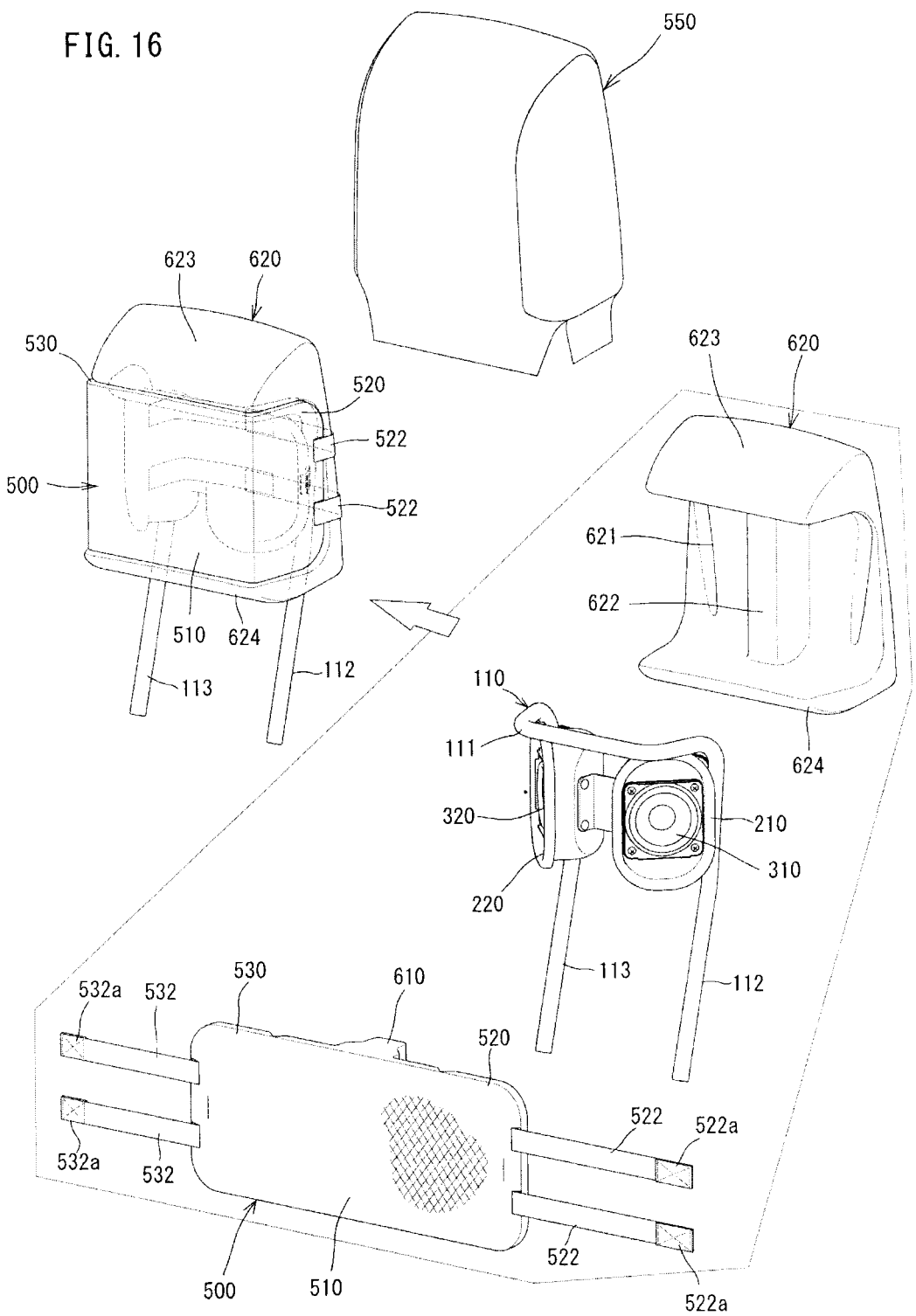
FIG. 16 is an exploded perspective view of the headrest according to the second implementation.

FIG. 13 to FIG. 18D are views illustrating a headrest 100 according to a second implementation. In the headrest 100, a headrest frame 110 has an integrated structure of a main frame 111 in a substantially U-shape in a plane view and a pair of headrest stays 112, 113 extending down from both side parts of the main frame 111, as illustrated in FIG. 16. This is different from the above-described first implementation in which the main frame 11 and the headrest stays 12, 13 are formed separately, but this structure is only an example, and either of the structures may be adopted.

Further, as in the above-described first implementation, the headrest 100 has a pair of left and right enclosures 210, 220, in whose inner spaces, speaker units 310, 320 are disposed respectively, and the speaker units 310, 320 are disposed so as to face outward with respect to a front side by about 45 degrees.

A headrest cushion member 400 includes a net member 500 made of a three-dimensional knitted fabric and a soundproof part 600. The net member 500 has left and right side parts 520, 530 sandwiching a middle part 510 with a predetermined width. The headrest 100 in this implementation includes side surfaces 103, 104 gradually fanning out from a front surface 101 in a direction of a rear surface 102, and the aforesaid speaker units 310, 320 are provided on the side surfaces 103, 104 so as to substantially face each other. More concretely, the side parts 520, 530 of the net member 500 are provided at positions corresponding to the side surfaces 103, 104. These side parts 520, 530 serve as acoustically transparent parts, and the middle part 510 therebetween form part of a soundproof part 600.

Concretely, as in the above-described first implementation, between the pair of enclosures 210, 220, a coupling plate 230 is disposed to absorb vibration and impact applied to the headrest 100. In an area from the coupling plate 230 to the middle part 510 of the net member 500 located on the front surface 101 side, a main soundproof part 610 in a substantially inverted T shape in a plane view as illustrated in the cross-sectional view in FIG. 15 is provided integrally with the middle part 510. Specifically, the main soundproof part 610 has a lateral side part 611 integrated with the middle part 510 of the net member 500 and a rearward projecting part 612 projecting rearward from a substantially center part of the lateral side part 611. The rearward projecting part 612 is disposed in a range so that it passes between the pair of enclosures 210, 220 to reach the coupling plate 230. Therefore, in the main soundproof part 610, the lateral side part 611 functions as a soundproof part located between the side parts 520, 530 being a pair of left and right acoustically transparent parts, and the rearward projecting part 612 functions as a soundproof part located between the pair of left and right enclosures 210, 220.

Further, in a range from the coupling plate 230 to a rear surface 102 of the headrest 100, an auxiliary soundproof part 620 is provided. The auxiliary soundproof part 620 is a molded body of polyurethane foam. As illustrated in the horizontal cross-sectional view in FIG. 15, the auxiliary soundproof part 620 has a substantially T shape in a plane view, with its part corresponding to the lateral side part 621 surrounding rear surfaces of the headrest stays 112, 113 forming the headrest frame 110, and with its substantially center part 622 projecting forward to pass between the pair of enclosures 210, 220 and reach the coupling plate 230. Further, as illustrated in FIG. 16, the auxiliary soundproof part 620 is integrally molded so as to include an upper cushion part 623 with a predetermined thickness at a position corresponding to an upper part of the headrest 100 and include a lower cushion part 624 with a predetermined thickness at a position corresponding to a lower part of the headrest 100.

Figure 18A:
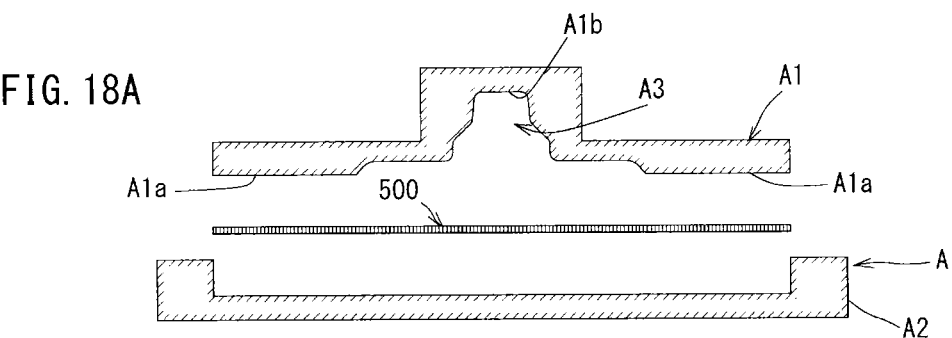
FIG. 18A to FIG. 18D are explanatory views of a method for manufacturing the structure, being part of the headrest cushion member, in which the net member and the main soundproof part are integrally molded.

Here, a method for manufacturing the headrest cushion member 400 integrally including the main soundproof part 610 will be described based on FIG. 18A to FIG. 18D. As illustrated in FIG. 18A, the net member 500 made of the three-dimensional knitted fabric knitted into a predetermined shape and cut into a predetermined size is set between an upper mold A1 and a lower mold A2 of a mold A. In one of the molds, in this implementation, in the upper mold A1, both side parts A1a, A1a project in a direction of the lower mold A2, and a middle inner surface A1b therebetween is formed so that a space A3 exists between itself and an inner surface of the lower mold A2. Concretely, the upper mold A1 is formed to have the space A3 in a substantially inverted T shape corresponding to the horizontal cross-sectional shape of the soundproof part 610 illustrated in FIG. 15.

Figure 18B:
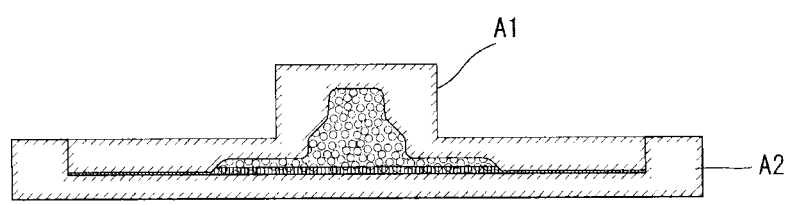

Next, as illustrated in FIG. 18B, the upper mold A1 is brought close to the lower mold A2. Consequently, the both side parts 520, 530 of the net member 500 located in the ranges of the both side parts A1a, A1a are pressed since the both side parts A1a, A1a of the upper mold A1 project in the direction of the lower mold A2. When, in this state, a synthetic resin material forming the main soundproof part 610, for example, a polyurethane foam material is injected between the upper mold A1 and the lower mold A2, the polyurethane foam material foams in the space A3 between the middle inner surface A1b of the upper mold A1 and the inner surface of the lower mold A2. Consequently, the polyurethane foam material penetrates into the middle part 510 of the net member 500 located in the range of the space A3 to integrally foam.

Figure 18C:
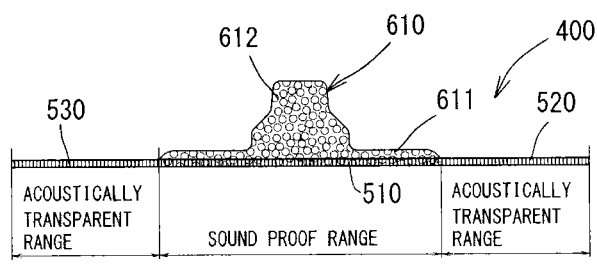

After demolding thereafter, the both side parts 520, 530 are restored to have a predetermined thickness as illustrated in FIG. 18C since the polyurethane foam material cannot penetrate into the both side parts 520, 530 of the net member 500 and the both side parts 520, 530 lose compression forces by the both side parts A1a, A1a of the upper mold A1. Therefore, the both side parts 520, 530 can be used as the acoustically transparent parts as they are. On the other hand, since the polyurethane foam integrally foams in the middle part 510, the middle part 510 together with the lateral side part 611 takes on a soundproof function between the both side parts 520, 530 which become the pair of acoustically transparent parts, and the polyurethane foam foaming along the space A3 becomes the rearward projecting part 612 to take on the soundproof function between the pair of enclosures 210, 220.

Figure 18D:
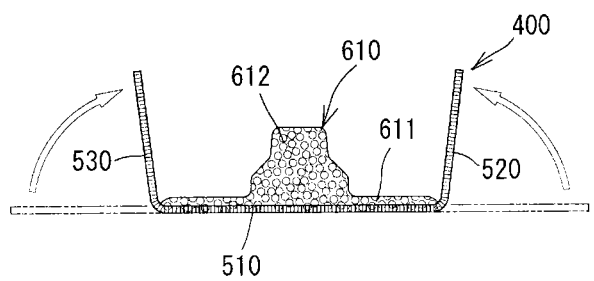

Then, as illustrated in FIG. 18D, the both side parts 520, 530 are folded inward and the main soundproof part 610 is disposed to be located between the enclosures 210, 220. Consequently, the both side parts 520, 530 can be easily positioned at the positions corresponding to the side surfaces 103, 104 of the headrest 100. As a result, the both side parts 520, 530 become the acoustically transparent parts of the left and right speaker units 310, 320 (refer to FIG. 15).

In order to more facilitate the arrangement of a structure of the integrally molded net member 500 and main soundproof part 610, which structure becomes part of the headrest cushion member 400, it is preferable that U-shaped engagement members 521, 531 are provided on the both side parts 520, 530 of the net member 500 and one end parts of attachment string members 522, 532 with a predetermined length are coupled to the both side parts 520, 530, as illustrated in FIG. 17. Further, on the other end parts of the attachment string members 522, 532, coupling parts 522a, 532a such as hook-and-loop fasteners are provided.

Next, a method of assembling the headrest 100 in this implementation will be described. First, as illustrated in FIG. 15 and FIG. 16, the auxiliary soundproof part 620 is placed from a rear side of the headrest frame 110 to which the enclosures 210, 220 housing the speaker units 310, 320 are attached, with the center part 622 of the auxiliary soundproof part 620 being located between the enclosures 210, 220. Next, the structure in which the net member 500 and the main soundproof part 610 are integrally molded is placed from a front side so that the main soundproof part 610 is located between the enclosures 210, 220. Next, the U-shaped engagement members 521, 531 provided on the both side parts 520, 530 of the net member 500 are engaged with peripheral edges of the enclosures 210, 220 (refer to FIG. 15). Then, the attachment string members 522, 532 are drawn to the rear surface side of the auxiliary soundproof part 620 and the coupling parts 522a, 532a of the both are joined. Consequently, it is possible to easily attach the headrest cushion member 400 having the net member 500, the main soundproof part 610, and the auxiliary soundproof part 620 to the headrest frame 110.

Next, an outer layer member 550 in a bag shape having an opening at its lower end is disposed to cover outer sides of the net member 500 and the auxiliary soundproof part 620, whereby the headrest 100 is assembled. The outer layer member 550 may be any, provided that it has a acoustically transparent property in the aforesaid ranges corresponding to the both side parts 520, 530 being the acoustically transparent parts of the net member 500, and various kinds of materials can be used in consideration of a contact sensation with the head, a cushioning property, design, and so on. In this implementation, the three-dimensional knitted fabric excellent in a cushioning property and a acoustically transparent property is adopted.

Incidentally, in this implementation as well, the enclosures 210, 220 of metal being the constituent members of the speakers function as the skeletal frame members supporting the headrest cushion member 400. Therefore, as in the above-described first implementation, it is possible to reduce the number of parts, simplify the structure, and reduce manufacturing cost.

The soundproof parts are provided between the pair of left and right enclosures which are a predetermined interval apart from each other and between the pair of left and right acoustically transparent parts formed in the net member forming the cushion member, respectively. Generally, speaker units are disposed at a predetermined distance apart from each other to increase the desired sound field. However, in a vehicle headrest, for instance, a distance between its left and right ends is about 20 cm to about 40 cm. Even if speaker units as sound output devices are disposed on the left and right, a high effect in terms of the spread of sound cannot be expected due to mutual interference of their sounds. On the other hand, since the soundproof parts are provided, it is possible to reduce the mutual interference of the sounds even when the pair of speaker units have to be disposed close to each other in a limited range of the headrest. Therefore, the same sound effect as that obtained when the speaker units are set at an interval appropriate for improving the spread of sound and a stereoscopic feeling can be expected.

Further, since the soundproof part is formed by integral molding with the net member, it is possible to enhance a soundproof property for reducing the sound interference and to simplify manufacturing steps and reduce manufacturing cost.

Further, the enclosures forming the speakers preferably have the function of supporting the headrest cushion member including the net member and the soundproof part. This makes it possible to use the enclosures together with the headrest frame as the skeletal frame members of the headrest, which eliminates a need for a front panel or the like protecting the speakers to reduce the number of parts, as compared with the structure of Patent Document 1 in which the speakers as the finished products are assembled in the headrest. Further, since the front panel and the like need not be used, it is not necessary to provide through holes in members disposed in front of the speaker units, which can simplify the structure, contribute to a weight reduction, and reduce manufacturing cost.

A number of implementations have been described. Nevertheless, it will be understood that additional modifications may be made without departing from the scope of the inventive concepts described herein, and, accordingly, other implementations are within the scope of the following claims.

What is claimed is:

1. A headrest with speakers comprising:
   a headrest frame;
   a pair of left and right enclosures supported by the headrest frame;
   speaker units supported in the enclosures respectively; and
   a headrest cushion member supported by the headrest frame to support a head, the headrest cushion member including: a net member having a pair of left and right acoustically transparent parts at places substantially facing the respective speaker units; and soundproof parts disposed between the pair of left and right acoustically transparent parts in the net member and between the pair of left and right enclosures respectively,
   wherein the net member is a three-dimensional knitted fabric,
   wherein the net member is provided with a predetermined tension in a plane direction along a surface of the three-dimensional knitted fabric, and
   wherein part of the headrest cushion member including the net member is in contact with the pair of left and right enclosures, and each of the enclosures together with the headrest frame functions as a skeletal frame member to support the headrest cushion member.

2. The headrest with speakers according to claim 1, wherein the acoustically transparent parts and the soundproof part formed by polyurethane foam injected located between the pair of left and right acoustically transparent parts in the net member are integrally formed.

3. The headrest with speakers according to claim 1, wherein the soundproof parts are each formed by using at least one of a sound insulating material and a sound absorbing material.

4. The headrest with speakers according to claim 3, wherein the soundproof parts are each formed by using polyurethane foam.

5. The headrest with speakers according to claim 1, wherein enclosures are made of iron-based metal.

* * * * *